US011403822B2

(12) United States Patent
Pavloff et al.

(10) Patent No.: US 11,403,822 B2
(45) Date of Patent: Aug. 2, 2022

(54) SYSTEM AND METHODS FOR DATA TRANSMISSION AND RENDERING OF VIRTUAL OBJECTS FOR DISPLAY

(71) Applicant: Augmntr, Inc., Grass Valley, CA (US)

(72) Inventors: Alexander George Pavloff, Grass Valley, CA (US); Bryan Lafayette Redd, Grass Valley, CA (US)

(73) Assignee: Augmntr, Inc., Grass Valley, CA (US)

( * ) Notice: Subject to any disclaimer, the term of this patent is extended or adjusted under 35 U.S.C. 154(b) by 0 days.

(21) Appl. No.: 16/579,384

(22) Filed: Sep. 23, 2019

(65) Prior Publication Data

US 2020/0098189 A1 Mar. 26, 2020

Related U.S. Application Data

(60) Provisional application No. 62/734,907, filed on Sep. 21, 2018.

(51) Int. Cl.
*G06T 19/00* (2011.01)
*G06T 17/20* (2006.01)
*G06T 17/05* (2011.01)
*G06F 3/01* (2006.01)

(52) U.S. Cl.
CPC ............ *G06T 19/006* (2013.01); *G06F 3/012* (2013.01); *G06T 17/05* (2013.01); *G06T 17/20* (2013.01)

(58) Field of Classification Search
None
See application file for complete search history.

(56) References Cited

U.S. PATENT DOCUMENTS

| 9,286,712 | B2* | 3/2016 | Kontkanen | G06T 17/05 |
| 2008/0310707 | A1* | 12/2008 | Kansal | G06T 19/006 |
| | | | | 382/154 |
| 2009/0273601 | A1* | 11/2009 | Kim | G06T 17/05 |
| | | | | 345/419 |
| 2009/0293012 | A1* | 11/2009 | Alter | G06F 3/0346 |
| | | | | 715/810 |
| 2011/0148866 | A1* | 6/2011 | Chu | G06T 17/05 |
| | | | | 345/419 |
| 2012/0092328 | A1* | 4/2012 | Flaks | G06F 3/012 |
| | | | | 345/419 |
| 2012/0264510 | A1* | 10/2012 | Wigdor | A63F 13/42 |
| | | | | 463/31 |
| 2012/0274633 | A1* | 11/2012 | Ivanov | G06T 17/20 |
| | | | | 345/419 |
| 2013/0131978 | A1* | 5/2013 | Han | G06T 15/20 |
| | | | | 701/436 |
| 2015/0287244 | A1* | 10/2015 | Watanabe | G02B 27/0172 |
| | | | | 345/633 |
| 2018/0089899 | A1* | 3/2018 | Piemonte | G06T 17/00 |

OTHER PUBLICATIONS

Hugues Hoppe; "Smooth View-Dependent Level-of-Detail Control and its Application to Terrain Rendering;" IEEE, Proceedings of Visualization '98 (Cat. No. 98CB36276), 9 pages; 1998 (Year: 1998).*

* cited by examiner

*Primary Examiner* — Edward Martello
(74) *Attorney, Agent, or Firm* — Fox Rothschild LLP; Kari L. Barnes (57) ABSTRACT

System and methods are disclosed for displaying real-time, geo-registered data in an augmented reality or other virtual environment. The system and methods may be configured to supply missing information from the real-time, geo-registered data set in order to facilitate the display in three dimensions.

13 Claims, 9 Drawing Sheets

SYSTEM AND METHODS FOR DATA TRANSMISSION AND RENDERING OF VIRTUAL OBJECTS FOR DISPLAY

PRIORITY

This application claims priority to U.S. Provisional Application 62/734,907, filed Sep. 21, 2018, and incorporated by reference herein in its entirety.

BACKGROUND

Although Microsoft's HoloLens is today's most capable commercial augmented reality (AR) headset device, the current generation and similar high-end AR devices lack global navigation satellite systems (GNSS) as well as any understanding outside its local X, Y, Z reference frame. This limits its functionality for outdoor use as Latitude/Longitude/Altitude information is unavailable.

Even if an AR device were to include GNSS, it would only provide the user a position of the device, and not further information to relate the virtual environment and the physical environment, such as direction, scale, landscape, elevation, etc.

The world is not a flat environment. It is not even a round environment. Instead, it is an oblique spheroid that includes modulations in elevation such as in valleys, mountains, hills, crevices, etc. Therefore, rendering virtual objects over a physical environment can be challenging.

Conventionally, applications for augmented reality systems simply overlay static icons at static locations away from the user. The overlay does not permit virtual objects rendered in the augmented reality environment to correlated or positioned relative to the real world, and/or physical locations. Conventional systems therefore do not permit external information or data to be rendered in a virtual overlay created within the physical environment in which the augmented environment is positioned. At best, some systems may use markers, such as a QR code), in which to determine a location for a rendered virtual object. In this case, the virtual object is rendered relative to the marker, such as the QR code. However, such systems still do not account for the variation of the physical environment in which the marker and/or virtual image is to be used. As in any conventional system, the rendering of the virtual object is in a static/predetermined location relative to a system parameter, whether it is to a detected object, position on the display, etc. These systems also cannot provide missing information or handle large data transfers for rendering objects in real time.

Rendering a data set within an augmented environment presents technical challenges and limitations. For example, high-resolution detailed elevation data is generally not available on the wearable device. If this data is not present on the device, 2-D data sets cannot be properly referenced into the 3-D display frame with only latitude and longitude points. To illustrate, take a conventional dataset for positioning objects within an area providing latitude and longitude for the object. If the location and direction of the headset were known, the objects relating to the dataset can be rendered in relation to the headset. However, their position in a real world overlay would be difficult. If the data set is limited to latitude and longitude, then the elevation position of the rendered object may be unknown. If all virtual objects are rendered at the same elevation, while the physical terrain is at different elevations, the experience may be illusory, the perception of the virtual objects may be distorted, and the augmented experience incomplete.

Even the most modern mobile devices have limited power and onboard processing capabilities. Depending on the resolution, elevation data sets can be very large, creating data download, local storage and processor loading challenges.

Large elevation data sets can require extensive processing power to render and may present a problem for certain wearable devices. If the display program has an option for different world scaling, each scaled version will require additional processing of the elevation data set. These activities can quickly consume the wearable device's resources and battery power reserves.

When accessing different data sources, the realities of different coordinate datums arise. Not all data sets utilize the same datum (i.e. WGS84, etc.) and to enable proper data exchange, it may be necessary for the mobile device to re-project one (or more) data sets into a common frame of reference. Failure to do so could result in incorrect assignment of target locations due to differences in the native data set's frame of reference.

SUMMARY

Exemplary embodiments described herein include software solutions for use with computer displays and/or augmented reality and/or virtual reality systems to generate a "geo-capable" device that functions in a world-wide reference frame and understands where the user is looking, thereby allowing the real-time display of georegistered information.

Exemplary embodiments may include a commercial AR software solution that delivers real-time, georegistered information. This novel capability allows the user to view digital holographic information, displayed in three dimensions (3D), projected on the physical environment in coordinates referenced by Latitude, Longitude and Altitude. Exemplary embodiments may be hardware agnostic and deployable to suitably equipped augmented reality (AR) and/or virtual reality (VR) systems. Displaying real-time, georegistered data in AR/VR reveals detailed information about the local environment and may enhance the user's overall situational understanding.

Exemplary embodiments may include an intelligent approach to device resource and data management. Exemplary embodiments may therefore transform and simplify data sets to maintain appropriate fidelity, while minimizing the required data. Exemplary embodiments may therefore include rendering data sets at the minimum allowable resolution to help mitigate issues in processing power, processing time, power consumption, and combinations thereof. The data set resolution may, or may not, correspond to the maximum possible resolution based on the source data available.

Exemplary embodiments may be used to determine a position of an electronic display device in order to relate virtual objects to physical locations in order to properly overlay, relate, and correlate virtual objects with real world physical locations. Exemplary embodiments may be used to determine a position of an electronic device for creating virtual objects. Exemplary embodiments may be used to allow the estimation of location or direction of the electronic device, such as determine the position and direction in which a user is looking. Exemplary embodiments may be used to create the digital earth map on which the user is working. Exemplary embodiments may be used with electronic devices with or without their own or in communication with their own positioning systems, such as a global navigation satellite system (GNSS).

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments may present real-time, real-world data sets to users in a hands-free, eyes-out interface. GIS data, video sources, LiDAR files and similar 3D data sets can be accurately rendered in the real-world location via exemplary embodiments of the geopositioning technology, systems, and methods described herein.

Exemplary embodiments may include a system to integrate 3-D LiDAR data and existing 2-D map tiles to create virtual object rendering in a three dimensional augmented reality environment. This capability may provide AR/VR-headset users easy visualization of combined 2-D/3-D/imagery datasets. Exemplary embodiments may be configured to handle disparity between data set datums, limits of headset processing power, acceptable data set reduction for large point-cloud clusters, video display limitations and managing battery life, and combinations thereof.

Figure 1A:
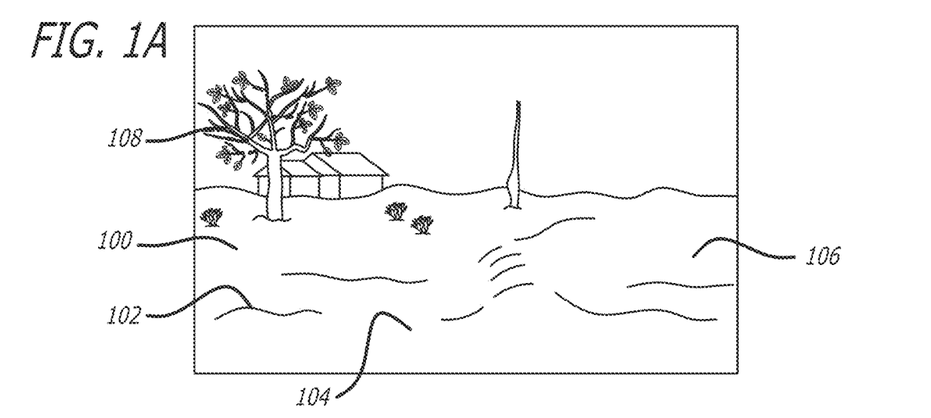
FIGS. 1A-1C illustrate an exemplary comparison of a physical view of an area and a view of the area augmented by virtual representations and information corresponding thereto correlated to the physical environment.
Figure 1B:
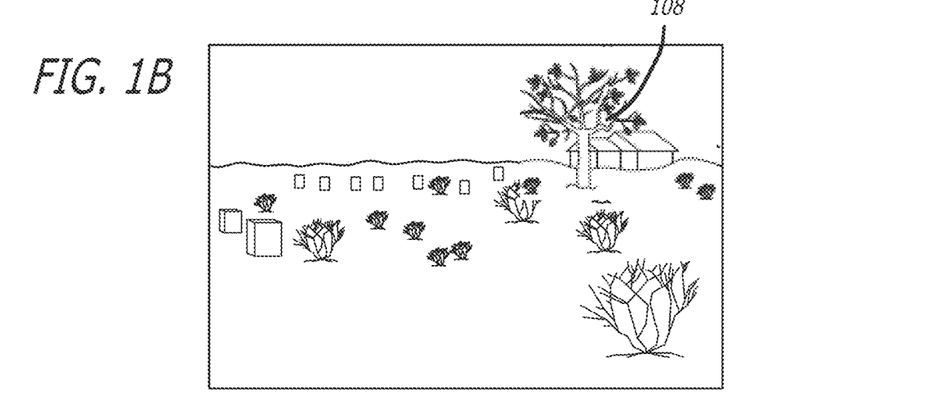
Figure 1C:
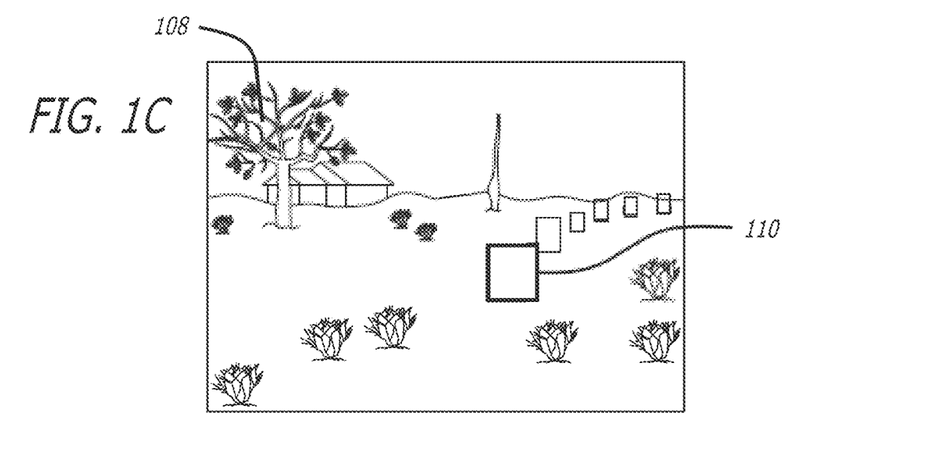

FIGS. 1A-1C illustrate an exemplary comparison of a physical view of an area and a view of the area augmented by virtual representations and information corresponding thereto correlated to the physical environment. FIG. 1A illustrates an exemplary physical environment. FIG. 1B illustrates a virtual rendering of a data set overlayed on the physical view looking in a first direction, and FIG. 1C illustrates a virtual rendering of the data set overlayed on the physical view looking in a second direction.

As illustrated in FIGS. 1A-1C, the physical environment 100 includes a ground layer 102 that defines different elevations. For example, a first elevation 104 may be lower than a second elevation 106, such as created by a hill, hole, or other topography. The physical environment 100 may also include physical objects 108.

As shown in FIGS. 1B and 1C, the system is configured to generate virtual objects for rendering in an augmented or virtual environment and position the virtual objects in physical relation to the physical environment in which the system is augmenting. For example, as seen in FIGS. 1B and 1C, virtual objects 110 in the form of cubes are rendered in the location of physical buildings that existed before a fire.

Figure 2:
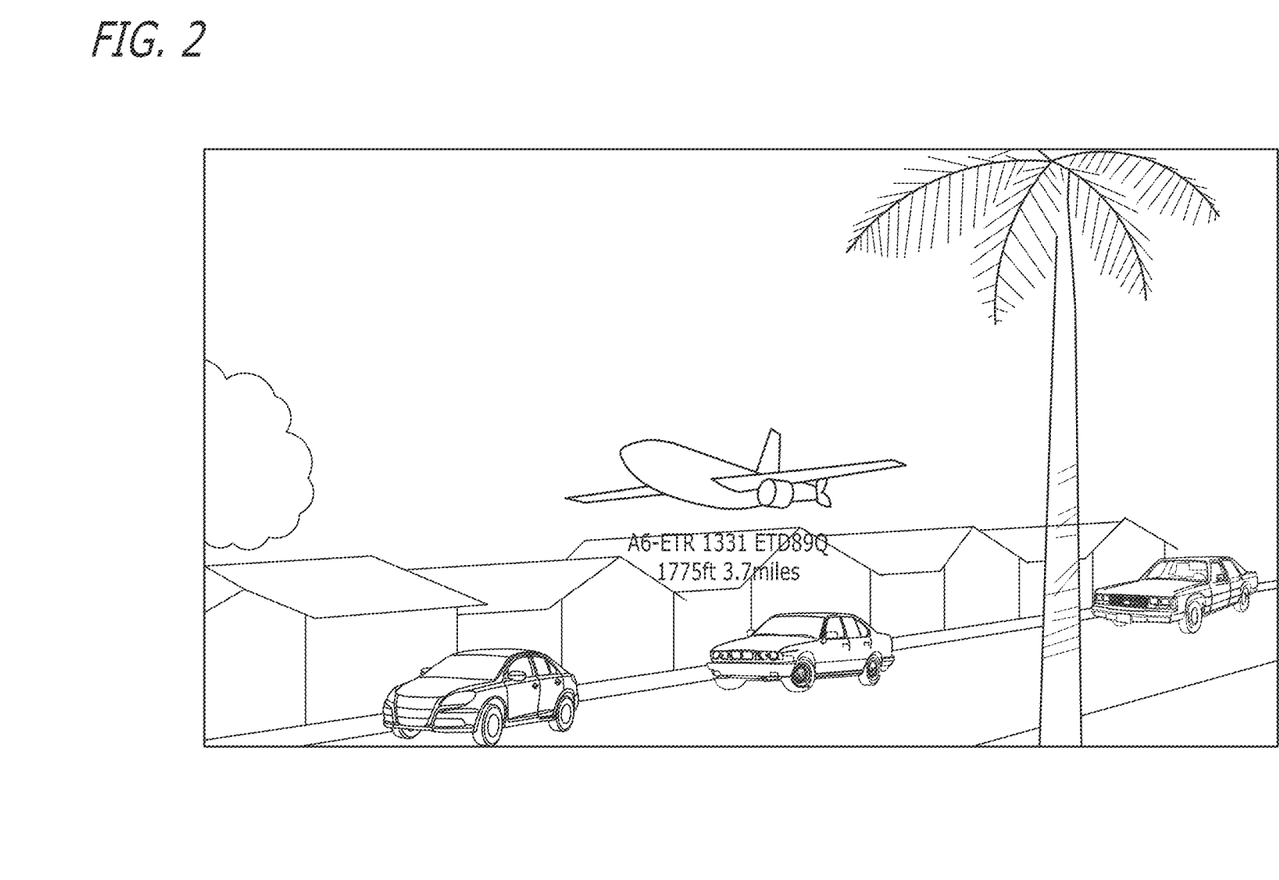
FIG. 2 illustrates another exemplary virtually augmented reality environment in which representations of aircraft landing in the physical environment of the augmented reality system are illustrated and overlay in relation to the physical environment.

FIG. 2 illustrates another exemplary virtually augmented reality environment in which representations of aircraft landing in the physical environment of the augmented reality system are illustrated and overlay in relation to the physical environment. As shown, additional information from or correlated to a data set may also be illustrated or virtually rendered in the environment. The correlated information may come from the data set itself or may be looked up through one or more other available datasets, linked by information provided or related to the data set.

Figure 3:
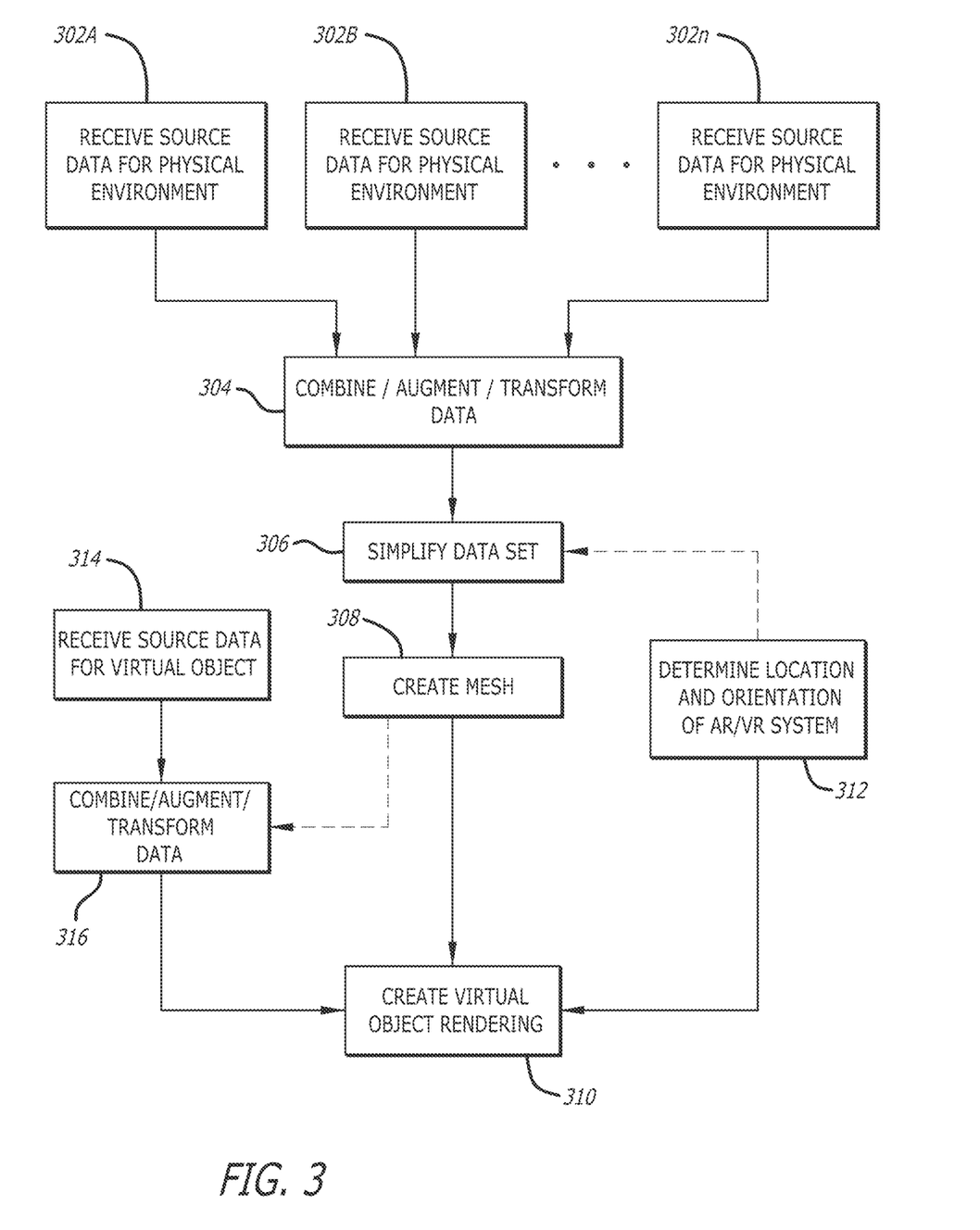
FIG. 3 illustrates an exemplary flow diagram for methods and/or system algorithms according to embodiments described herein.

FIG. 3 illustrates an exemplary flow diagram for methods and/or system algorithms according to embodiments described herein. As shown, the system may receive one or more source data sets. For example, the source data sets may be map locations including latitude, longitude, and elevation. The data sets may correspond to any attribute of a physical environment in which to create a reference frame.

Exemplary embodiments include systems and methods permitting the arbitrary conversion of a local augmented reality environment reference frame to a world based reference frame in a unidirectional (in either direction) and/or bidirectional conversion processes. For example, data sets represented in a physical environment latitude and longitude can be rendered in relation to the x, y, z coordinate system of a headset or AR/VR environment and/or vice versa.

Exemplary embodiments described herein provide systems and methods for on the fly data processing and conversion. Exemplary embodiments may provide methods for optimizing the speed and processing of the methods described herein to reduce processing power, reduce power consumption, minimize time elapse for processing, and combinations thereof.

As seen in FIG. 3, the system algorithms and methods may include one or more source data corresponding to the physical environment, which may be combined and processed according to embodiments described herein. Exemplary embodiments result in a mesh representation of the physical environment. The system algorithms and methods may then use the mesh, along with other source data for generating and rendering the virtual object over the physical environment.

At steps 302A, 302B, one or more source data sets are received by the system corresponding to one or more attributes of the physical environment. Two data sources are illustrated, but any number of datasets 302n may be used. The source datasets may be in different forms. For example, the data sets may correspond to different reference frames, different scales, different units, different resolutions, and any combination thereof. Any number of datasets may also be provided. In an exemplary embodiment, source data may be received from both public internet servers as well as private local storage, and locally scanned data provided by the user for their specific application may also be used as exemplary data sources according to embodiments described herein. Exemplary embodiments may also include internet of things or other nodes, sensors, or other sources as data sources according to embodiments described herein. For example, real time sensors, such as local temperature or pressures sensors, may provide real time condition data to the system as a data source. Source data may be in the form of raster elevation data, LiDAR data, vector data, image data, text data, video data, and combinations thereof. The data may be provided as one-dimensional, two-dimensional, three, four, or five dimensional formats. For example, a one dimensional data set may simply be readings from a sensor without regard to a location or time information. Two dimensional data may include the data information with a position and/or time element.

At step 304, the system analyzes, transforms, and/or combines, the received data from steps 302A-302n. Exemplary embodiments may include steps for converting data sets for uniformity and processing, combining different data sets, preparing the data sets for rendering in an augmented or virtual reality environment, or any combination thereof.

In an exemplary embodiment, the one or more data sources may include different information. For example, the information may be on different scales, units, reference or coordinate systems, etc. The system may recognize the data configuration and/or receive information about the data as an input and/or already have the data configuration programmed relating to a source of the data. The system may take the raw data set and the data configuration to convert the data into a uniform structure.

In an exemplary embodiment, the datasets may be augmented to include missing information. For example, if a dataset is lacking specific information, the system may generate the missing information by approximating known information. The system may also, or alternatively retrieve another data set that includes the missing information or information related to the missing information to generate the missing information. The system may therefore recognize a dataset is missing information and thereby retrieve another data set for creating, combining, transforming, etc. according to embodiments described herein to supply the missing information or an approximation of the missing information.

In an exemplary embodiment, the system may generate the missing information. The system may record historical information, and/or have access to additional information.

For example, for a moving vehicle (such as a boat or airplane), the system may include a data source having historical information of location, speed, direction, time, or a combination thereof. The system may also include a data source having information about the origin, location, destination, departure time, expected arrival time, or combinations thereof. The system may use any combination of the data available to project or estimate data that may be missing. In the event that system received present location data at a delay from real time, the system may be configured to estimate the present location of the vehicle based on any combination of the data it has available. The system may use the last known location, the destination location, the time at the last known location, the expected time to arrival, and the current time to estimate a present location at the current time between the last known location and the destination location. The system may use a plurality of last known locations along with their associated time stamps to determine a travel speed, direction, and an elapse time from the last known location to estimate a present location.

As another example, for a sensor feed, the received data set may only include the sensor data or may also include a time stamp. The location information may be missing. The system may be configured to detect or receive the location information for placement of the data source information within the virtual environment.

As another example, for the parcel location information, such as house locations and parcel boundaries, the data source may include latitude and longitude coordinates, but may be missing the elevation information. The system may therefore use, for example, the elevation mesh created from the physical environment data source, such as described herein with respect to step 308, to supply the missing elevation data for the given latitude/longitude coordinates provided within the given data set. This may occur, for example, when different data sets use information from other data sets, such as illustrated by the dashed line between steps 308 and 316 of FIG. 3.

In an exemplary embodiment, if more than one data set is provided, the data sets may be combined. The combination may include combining and/or filtering the combined data set. For example, two data sets may overlay and produce redundant data information that may be filtered and/or removed from the combined data set. Other data set combination and filtering methods and techniques may also be used and are within the scope of the instant disclosure.

In an exemplary embodiment, the data set may be transformed to a usable data set for generating virtual objects and/or for use in the augmented/virtual reality rendering of the virtual objects. The transformation to a usable VR/AR data form may be combined or integrated into one or more of the steps described herein, such as in creating a uniform structure. The transformation may also be performed separately, such as before or after one or more other data transformation/analysis steps.

All modern 3-D graphics engines utilize triangles to render items. Vertices (X,Y,Z points) and triangles create the geometry that describes all required points of the digital surfaces. Specific "shader programs" then draw the digital surface and control its look, texture (images placed upon it), how it interacts with lighting, etc. Device resource optimization avoids rendering obscured areas. Exemplary embodiments described herein may include transforming the data sets received about a physical environment and tessellating the data to transform the data set into a triangular data set for graphics rendering. For example, conventional physical environment data sets are generally taken in grids such as square or rectangular spacing. Each rectangular data set can be divided into two triangles for triangular representation.

As illustrated in FIG. 3 at step 306, exemplary embodiments may include simplifying the data set(s) by reducing the information within the data set while maintaining an appropriate fidelity for a given application.

In an exemplary embodiment, Level of Detail (LoD) techniques may be used to simplify a data set. LoD involves rendering the models at a farther apparent distance from the "viewer" with less detail, saving system resources while remaining unnoticeable to the user. This concept lends itself to rendering of Digital Elevation Maps (DEMs). Typical DEMs (USGS's National Map Elevation data, NGA's worldwide DTED data, etc.) contain a series of regularly spaced points on a grid that contain all required elevation data. The dataset corresponding to locations closer to the point of interest, such as the user for rendering within the augmented reality environment, include denser data sets or more points, such as all of the spaced points on a grid, while locations that are further away from the location of the point of interest may be less dense data sets, such that the data corresponds to information at locations having greater space between their points on the grid. In an exemplary embodiment, information very far away, such as out of sight of a user at the point of interest, may not be retrieved or displayed at all. The point of interest may be provided to the system, such as by a user entry. The point of interest may be automatically achieved, such as by receiving location information from the system. The point of interest may be achieved through communication through one or more other sensors, devices, sources, etc. For example, the information of the location and/or orientation may be obtained at step 312 and provided at step 306 to use to simplify the data set.

In an exemplary embodiment, Digital Elevation Map (DEM) simplification helps reduce system load. A "2-D Decimation" converts the DEM grid to triangles (2 triangles for 4 points), giving an equal density of triangles across the surface. A "Simplified Triangle Mesh" reduces the number of triangles needed while retaining detail by combining triangles across all flat surfaces. For example, a nearest neighbor comparison between adjacent and neighboring triangles can be determined. If the variation between triangles is within a desired threshold, then the information within the triangle can be combined, thereby reducing the data set.

In an exemplary embodiment, the transformed information may be taken at different densities. Thereby, given data sets may be filtered to remove intervening values or averaging values over larger dimensional spaces. Such averaging or skipping data points may reduce fidelity. Therefore, effects and assessment on the resulting fidelity is preferred.

As illustrated in FIG. 3 at step 308, exemplary embodiments described herein may create a geographical mesh representing a physical environment that can be augmented by the system. The mesh may be a virtual mesh that may or may not be displayed to the user. The mesh may thereafter be used to transform and/or supply missing information within data sets to be rendered in the virtual space and overlaid on a physical environment.

Figure 4A:
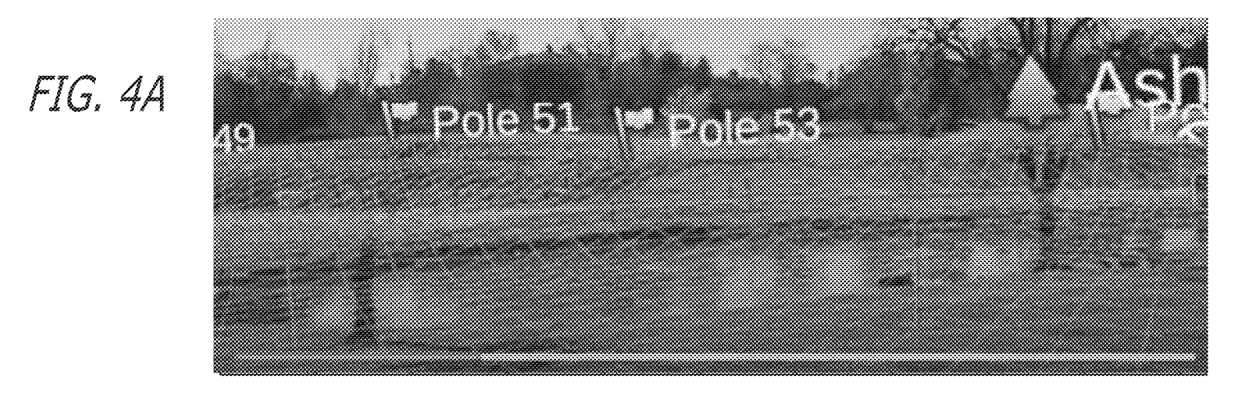
FIGS. 4A-4D illustrate a mesh overlay in which a data set of elevation is rendered on a physical environment.
Figure 4B:
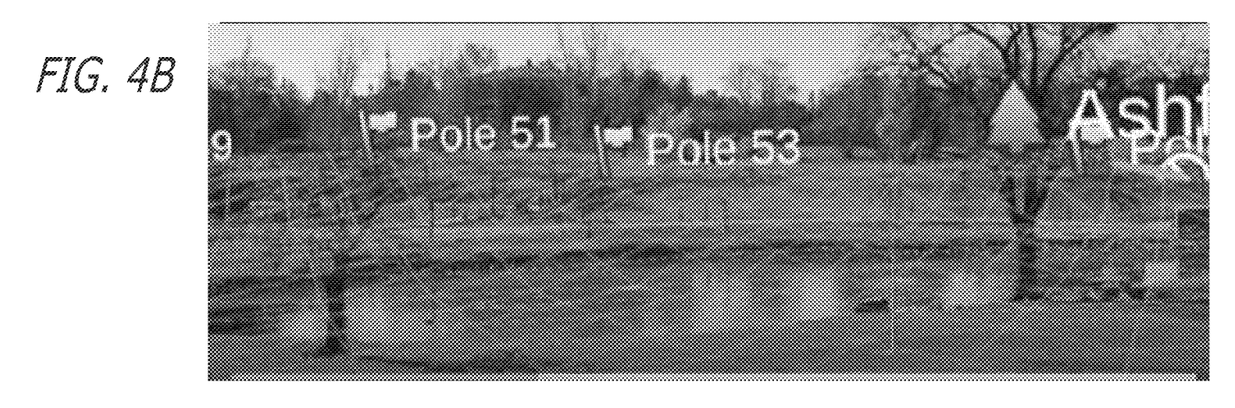
Figure 4C:
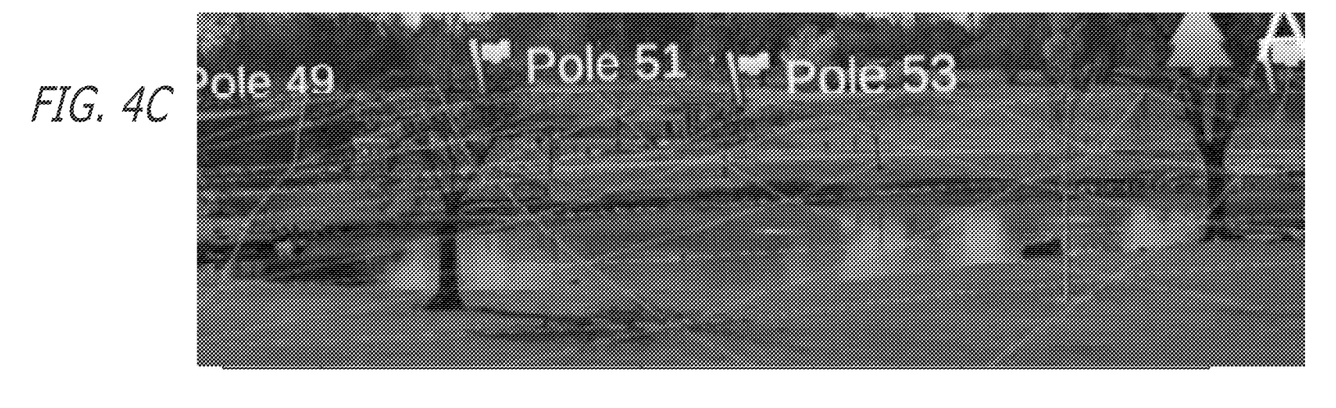
Figure 4D:
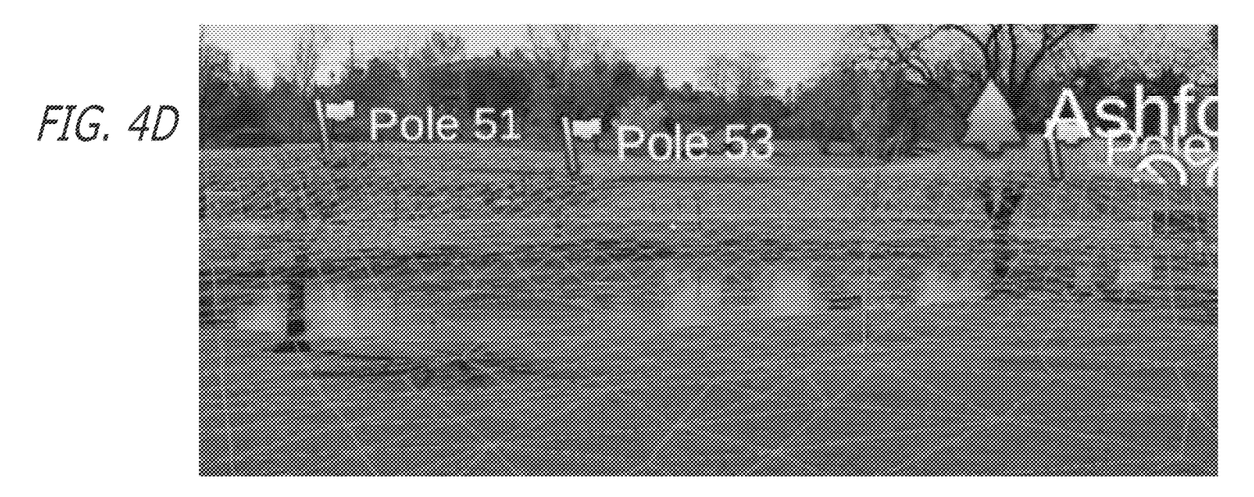

FIGS. 4A-4D illustrate a mesh overlay in which a data set of elevation is rendered on a physical environment. The data set was received and rendered in a triangular format, such as seen in FIG. 4A. FIGS. 4B-4C illustrate the same data set taken at different intervals and/or averages such that the granularity and therefore fidelity of the information is reduced. FIG. 4A may illustrate the representation of a dataset that has been transformed according to embodiments described herein and retain a granularity and/or fidelity approximate to the original data set. FIGS. 4B-4D may illustrate the representation of a dataset that has been simplified according to embodiments described herein and may include reduced granularity in the dataset while maintaining a fidelity of a desired level relative to the raw dataset.

FIG. 4C illustrates an exemplary mesh in which the data fidelity is maintained by combining areas of little transition to create larger granularity (lower density mesh) and maintaining the data set for areas of greater transition to create finer granularity (higher density mesh). For example, the lake portion of the physical environment does not change elevation for significant portions of the surface, thereby permitting triangular representations of the elevation to be combined and a few data points to define a larger geographic area, while the hills having greater transition are represented with greater density such that greater data points are used to define the geographic area.

Determining whether the fidelity can be lowered, such as for areas of little transition between adjacent data points, can be achieved in different ways. For example, the system may directly compare adjacent data sets to determine if the deviation is within a threshold. If it is, the system may average the data points or otherwise determine an appropriate value for the aggregated data point. In an exemplary embodiment, the aggregated data point may be a weighted average, where the weight is related to a deviation between the value to be weighted in the average and a value in an adjacent data point that is not weighted in the average. In this way the value that has a near neighbor that changes more aggressively can influence the average of the combined set more than the next point that then transitions less aggressively. In combining multiple adjacent data points, the system may compare the data points across the data set and then combine appropriate points that are within a given threshold to create the aggregated data point and corresponding value of the aggregated data point. In combining multiple adjacent data points, the system may compare individual data points sequentially against a given threshold and determine interim values for the aggregated data point. The interim aggregated data point may then be used in the comparison for the next sequential data point. In combining multiple adjacent data points, the system may compare adjacent data points sequentially against the threshold and determine the aggregated data point after the multiple adjacent data points have been identified, such that an average is taken from all of the identified multiple adjacent data points to be aggregated.

As another example of how the system may determine whether the fidelity can be lowered, knowledge of identified attributes may be used. For example, lakes do not change elevation because of the nature of resting water. Therefore, if the system either determines the presence of a lake, such as through image recognition, or the system receives information about the presence of a lake, such as through a data set having the boarder of a lake or through user inputs of identification of lakes, the system may lower the fidelity of the data set within the identified area. The identified may be used to increase or lower the fidelity of the data set within the identified area. For example, if mountains, hills, or other structure known to change elevation may require a higher fidelity data set, verses the areas identified as lakes. As another example, information about roads may be provided at a given fidelity because it is known that roads have a maximum elevation transition given the limitations of the vehicles that use the roads. Therefore, road data may be given in a desired fidelity to capture the desire level of detail given the known qualities of the data set.

Once the data sets are combined, transformed, and simplified, a digital mesh is defined to create a local reference frame for the augmented reality system related to the real world environment within which the augmented reality system resides and used for viewing and/or augmenting.

Referring to FIG. 3 at step 314, the system also receives another data source for information for rendering the virtual objects. The information may relate to textual information, and/or relate to virtual graphical representations to be overlaid on the view of the physical environment. Similar to the datasets of 302n, the dataset received for the virtual objects may include one or more datasets in one or more data configurations. Therefore, similar to steps 304-308, the system at step 316 may combine, analyze, transform, simplify, or otherwise manipulate the dataset to generate a usable dataset for generating the desired virtual objects. Therefore, the information received about the virtual objects from the other data set(s) may be transformed such that it can be rendered within the graphical environment of the augmented reality system. Exemplary transformations may include using the mesh to incorporate elevation or other missing data information into the data source for the virtual object.

As seen in FIG. 3 step 312, the system may also determine the location and orientation of the headset itself, and/or other desired viewpoint for rendering the virtual objects relative to the physical environment. The determination may be used to properly render and position the virtual objects within the physical environment. The location and orientation of the headset may also be used to simplify the data set, such as in determining a level of fidelity and/or granularity for any of the one or more data sets for the physical environment and/or for the virtual object, at steps 304, 306, and/or 316.

In an exemplary embodiment, the system may be initially calibrated such that its position and/or orientation is entered or determined by the system. Once known, the system may track location by sensors within or external to the headset. Exemplary embodiments permit the headset to determine its own location and/or orientation based on inputs identified in its environment and/or from one or more systems communicating with or part of the system. In an exemplary embodiment, the system may be calibrated by entering a GNSS location of the headset and directional orientation. The system may include one or more sensors for determining location, and/or direction. The system may include a global navigation satellite system (GNSS), local navigation position system, global position system (GPS), magnetometer, compass, accelerometer, vibration sensor, tilt sensor, and combinations thereof to determine a location and orientation of the system and/or track or determine a continued location and/or orientation from an original location and/or position. The system may include external location tracking, such as, for example, ultrasound, acoustic, light, infrared, ultraviolet, radio frequency, or other signal detection for determining location and/or orientation relative to one or more other known sources.

At step 310 of FIG. 3, the system may generate and/or display a virtual object for display in an augmented reality environment. The system may use any combination of data sets described herein for rendering and displaying the virtual objects.

In an exemplary use case, an exemplary embodiment of geopositioning software ingests multiple types and classes of data sources. The exemplary test case may use USGS 1/9 arcsecond (~3 m nominal) post spacing, sub-centimeter resolution elevation data and OpenStreetMap vector data covering the same physical area. The information may be combined to create a comprehensive, reduced, fidelity mesh for representing a reference frame of the physical environment. An exemplary mesh may define the topography of the physical environment. The vector data may include additional information such as roads, power poles, lines, and several points of interest, but is configured only as latitude and longitude information, without elevation data. Virtual objects related to this information, such as in the information associated with the vector data (i.e. road names) or virtual objects representing the vector data (i.e. icons for lines, posts, etc.) may be rendered or overlaid once the data is transformed and supplemented with the mesh to provide the missing information from the data set. This highlights a typical technical challenge when merging multiple data sets.

Exemplary embodiments may therefore manage all required data conversions and renders a merged data set in an exemplary virtual reality or augmented reality display.

Exemplary embodiments may be used to create real-world positional accuracies comparable to those delivered by commercial internet mapping providers.

Exemplary embodiments may provide novel and meaningful ways for user viewing and interaction within an augmented or virtual reality system. A real-time view of georegistered information can be a powerful tool for a user, commercial, enterprise, and military. Although discussed herein in terms of augmented reality systems, exemplary embodiments are equally applicable to virtual reality systems. Therefore, whenever augmented reality or AR is referenced herein, virtual reality is intended to be included as well. Exemplary embodiments also do not require either an AR or VR environment, but may also be applicable to any display, manipulation, and/or ingestion of georegistered information through any display system, such as on a conventional computer display or mobile device screen.

Exemplary embodiments described herein may include software configured to run on a computer and/or VR/AR system to georegister datasets corresponding to the VR/AR system and/or geographical image rendered by an electronic device. Exemplary embodiments may be used to support users that desire hands-free, eyes-out solutions.

Figure 5:
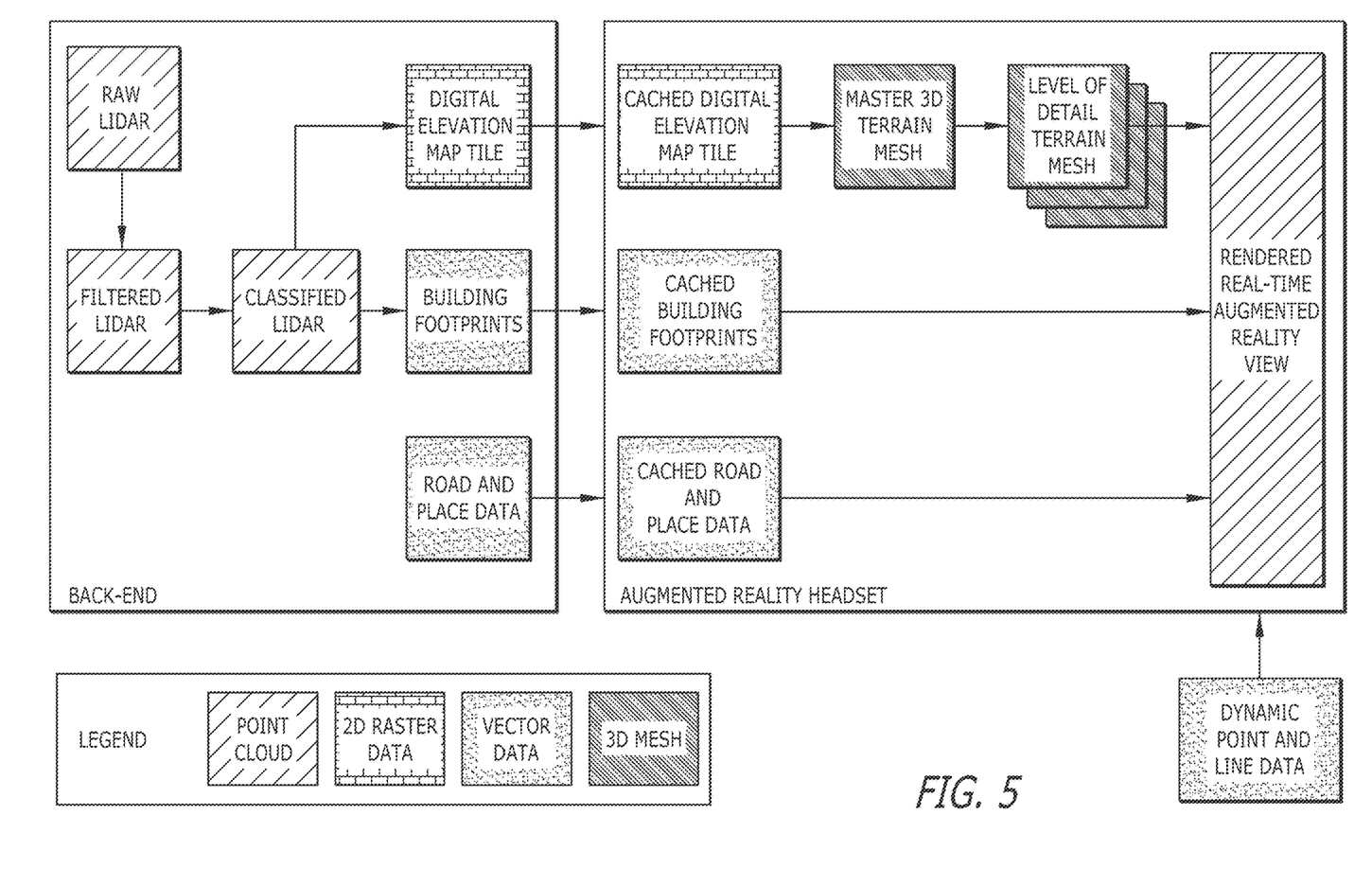
FIG. 5 illustrates an exemplary data processing representation for the back end and real time processing according to embodiments described herein.

FIG. 5 illustrates an exemplary data processing representation for the back end and real time processing according to embodiments described herein. In an exemplary embodiment, the system includes a back end for receiving, generating, storing, combining, augmenting, transforming, simplifying, or otherwise processing data according to embodiments described herein. Datasets in a form usable by the AR system may thereafter be cached on the AR headset and/or local system for use in rendering a real-time virtual object for an augmented reality view. The headset may use its dynamic positional and directional data to render the virtual object in real time and corresponding to the physical environment that is being augmented.

Exemplary embodiments of the back end may generate any variety of information based on any available or created data set(s). For example, the back end may include the raw data sets and/or the processing and memory capabilities for combining, augmenting, transforming, simplifying data sets according to embodiments described herein, such as with respect to the physical environment and/or the virtual object. The back end may also include the augmented reality usable data sets, such as those having been processed, combined, filtered, and/or transformed. As illustrated, exemplary data sets may include light detection and ranging data sets for providing an elevation data set of a physical area. Other data sets may include digital elevation tiles, building footprints, road and place data, or any other type of geospatial data.

This data may be made available to the AR headset via a network interface. The AR headset knows its location or the location of the desired data, and may pull down the data that is relevant. The system may therefore be configured to read data, analyze or identify desired data, and download and/or retrieve data relevant to the AR headset, such as based on data related to location(s) proximate to the headset or within a predefine and/or user defined proximity distance. The data may then be cached on the device, removing the need for constant network access. If the data is in a format not suitable to the current display method (for example, a highly detailed elevation map when only an overview is current being viewed), the data may be converted on the device to the necessary display formats, with the high-resolution data retained for future use in geolocation or other display scenarios. Alternatively, the system may be configured to realize the current viewing setting and pull down a dataset and/or create a dataset corresponding to the current display method. As an alternative, a variety of different expected formats can also be generated on the back-end, allowing for faster data transfer and less calculation, as needed.

In an exemplary embodiment, data can be loaded from other AR headsets on the same network, allowing for faster data transfer and less calculation without the need for a backend. In an exemplary embodiment, multiple headsets may be used in conjunction for distributive storage, processing, etc.

Figure 6:
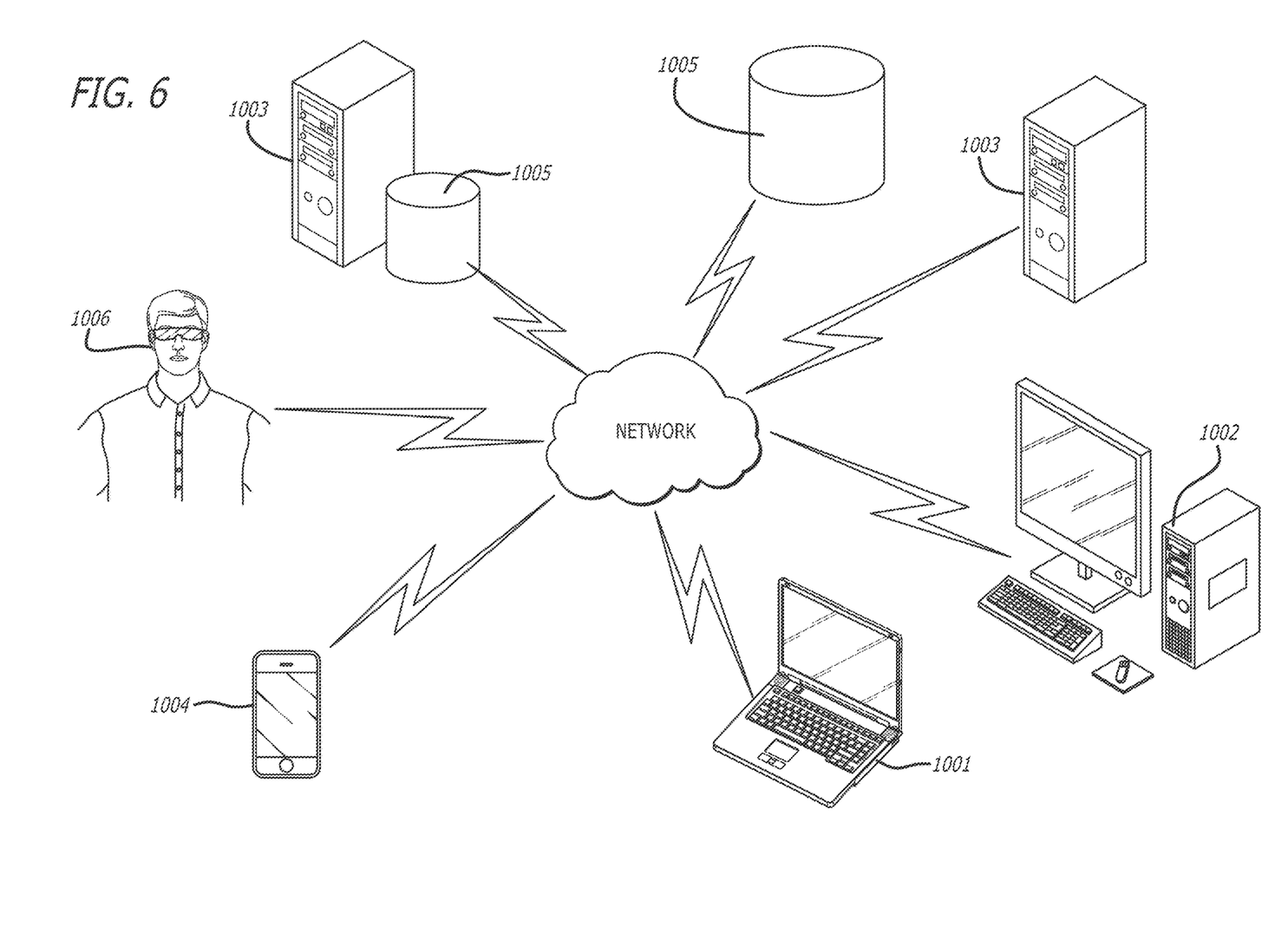
FIG. 6 illustrates an exemplary system configuration according to embodiments described herein.

FIG. 6 illustrates exemplary system configuration according to embodiments described herein. Exemplary embodiments of the system described herein may include an augmented reality system 1006. The augmented reality system may include a processor, memory, and/or communication interface to communicating with remote systems, such as server 1003 and/or memory comprises databases 1005. Exemplary embodiments may also include a computer, computers, an electronic device, or electronic devices. As used herein, the term computer(s) and/or electronic device(s) are intended to be broadly interpreted to include a variety of systems and devices including personal computers 1002, laptop computers 1002, mainframe computers, servers 1003, mobile phone 1004, tablet, smart watch, smart displays, televisions, augmented reality systems, virtual reality systems, and the like. A computer can include, for example, processors, memory components for storing data (e.g., read only memory (ROM) and/or random access memory (RAM), other storage devices, various input/output communication devices and/or modules for network interface capabilities, etc. For example, the system may include a processing unit including a memory, a processor, a plurality of software routines that may be stored as non-transitory, machine readable instruction on the memory and executed by the processor to perform the processes described herein. Additionally, the processing unit may be coupled to one or more input/output (I/O) devices that enable a user to interface to the system. By way of example only, the processing unit may receive user inputs via a keyboard, touchscreen, mouse, scanner, button, camera, hand gestures, voice command interfaces or any other data input device and may provide graphical displays to the user via a display unit, which may be, for example, a conventional video monitor, an augmented reality display system, or a virtual reality display system. The system may also include one or more wide area networks, and/or local networks for communicating data from one or more different components of the system. The system may receive and/or display the information after communication to or from a remote server 1003 or database 1005.

In an exemplary embodiment, the system may be configured to store software and data sets directly on one or more display devices, such as the AR headset. The system may download the requisite information for rendering virtual objects at the AR headset and/or system components proximate the AR headset. Therefore, the AR headset may be remote or separated from the network such that local data stored or generated directly at or on components in local communication with the AR headset may be used for rendering the virtual reality objects. The headset system may therefore be used when access to remote servers or the network are not available. The system may be configured to update data sources, data, or locally stored information when a connection is available. The updates may be two way, such that information received, generated, or used at the headset system may be communicated to a remote location for processing, storage, backup, viewing, etc., as well as updates from remote locations used to update the information at the local headset system. The updates may also be configured to be run manually and/or automatically. In an exemplary embodiment, the augmented reality headset system may detect connection to a network. Exemplary embodiments may therefore be used without interruption even when connections are sparse and have interruptions, while still providing the most real time information available to local AR headset.

Exemplary embodiments described herein may be used in any augmented reality system to define a software library to enable a standard augmented reality or virtual reality system to become a fully "geo-capable" device. By converting the user's local "flat space environment" into a world-wide (latitude/longitude/altitude or L/L/A) reference frame, exemplary embodiments of a geo-capable augmented reality system including software visualizes where the user is looking relative to the real world. With exemplary embodiments of the geo-positional software, an augmented reality device can display real-time georeferenced data sets to the user without having its own GPS system. Exemplary embodiments may also be used with systems having a GNSS, Inertial Navigation System (INS), or other positioning system. In exemplary embodiments, the system may be configured to provide higher fidelity geolocation predictions.

Exemplary embodiments include a software library for storage and execution at the display device for rendering virtual objects in real time based on geo-positional data sets. Exemplary embodiments include a storage of one or more geo-positional data sets at a remote server and/or database that may be downloaded and cached by an augmented reality system. In an exemplary embodiment, the system is configured to download only a partial data set of the geo-positional data set corresponding to the data corresponding to geo-positions within a given proximity to the display device and/or user and/or specified location and/or region.

Exemplary embodiments may be configured to render virtual objects with respect to information within a data set and/or use the data set to retrieve information from other data sources to provide additional information or virtual objects for overlay within the augmented environment. For example, an incoming data set may include aircraft information such as tail number and location. The system may be configured to retrieve the tail number and look up other information about the aircraft, such as its type, an image of the aircraft, its destination, its passenger list, etc. Exemplary embodiments may then use this information to generate virtual objects for rendering in the augmented environment.

Exemplary embodiments may also include rendering virtual objects and/or providing user displays in different user display configurations. The system may therefore include user input and/or interface devices to receiving input from a user and/or for changing the user view of the rendered virtual objects. For example, a user may select a view in which virtual objects are rendered in a 1:1 scale to their physical environment. The user may also select to view in which a user may essentially zoom in or zoom out to get an overview perspective of additional information. For example, a user may transition a selected view to reduce visual clusters in a 1:1 scale by using a smaller proximity distance verses the overview or larger scale view with a larger proximity distance.

Exemplary embodiments may also include on the fly rendering or user inputs of virtual objects to be rendered and/or created as a dataset or included in an existing data set. For example, as a user is within the system and perceives the real time rendered virtual objects in their augmented reality environment, the user may also provide inputs to the system to generate additional virtual reality objects and/or to modify, alter, delete, or add to the virtual reality objects already rendered by the system.

Exemplary embodiments may also permit the export of information from the system. For example, a user may capture a video and/or still image during use of the system that may include an overlay of the virtual objects rendered during use. Such exported video, still frames, and/or sequences of images may be used for remote monitoring, collaboration, quality assurance, record retention, and/or other purpose. Therefore, exemplary embodiments may include a camera or other image capturing system, or other method of retrieving an image, and a system for overlaying or altering the image to include a rendered virtual object. Exemplary embodiments may permit the one way and/or two way sharing, manipulation, real time display, etc. between the augmented reality system and another display, whether another augmented reality system and/or other display system.

Figure 7A:
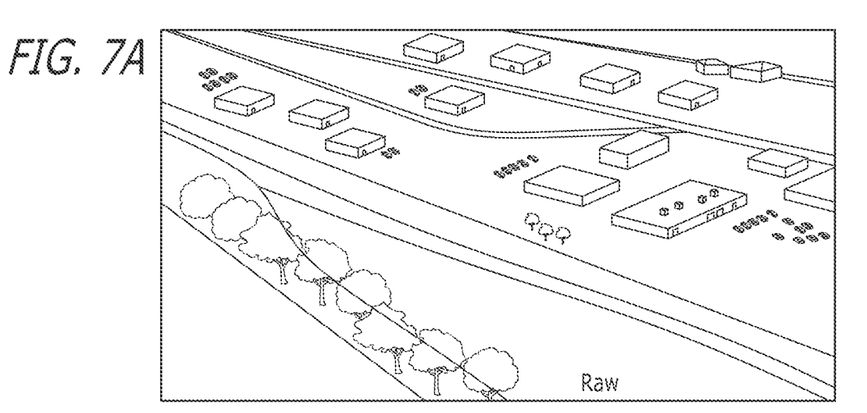
FIGS. 7A-7C illustrate an exemplary embodiment of a user display of an editing suite that enables integration of precision geo-registered 3D information into video for a Utility Inspection application.
Figure 7B:
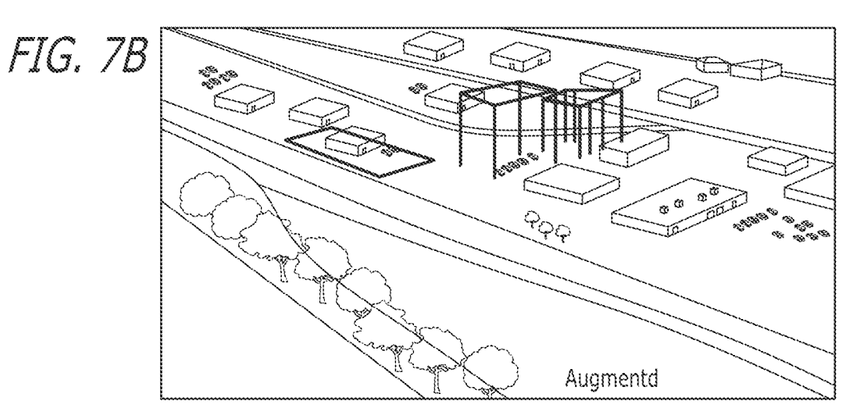
Figure 7C:
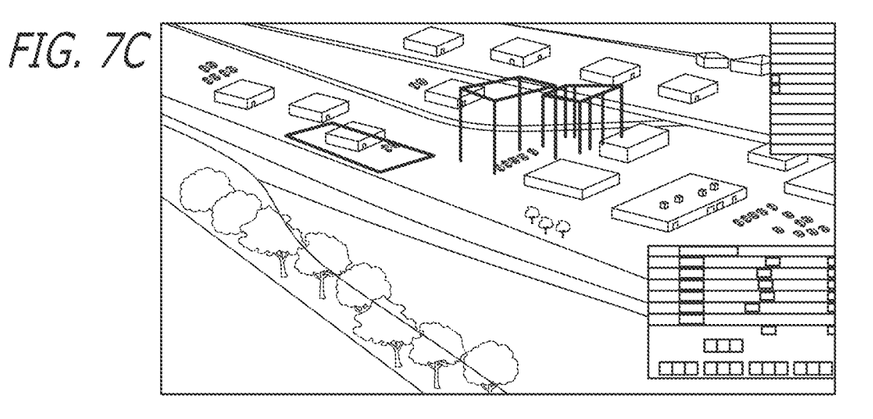

FIGS. 7A-7C illustrate an exemplary embodiment of a user display of an editing suite that enables integration of precision geo-registered 3D information into video for a Utility Inspection application. FIG. 7A illustrates an exemplary raw fee of an aerial video and/or still, and FIG. 7B illustrates an exemplary augmented display with geo-referenced Keyhold Markup Language (KML) load and adjusted metadata. Export of still frames and/or image sequences may be extracted and shared with other users and/or stored. FIG. 7C illustrates an exemplary user interface including one or more user interface input/output displays for manipulating the display of one or more virtual objects displayed on the image and/or to a user.

Although exemplary embodiments described herein are for generating local reference frames for use with an augmented reality system, embodiments and use of the system described herein are not so limited. Exemplary embodiments may also include display of physical environments augmented by virtual objects in other display systems, such as virtual reality or screen display systems.

Referring to exemplary embodiments of FIGS. 7A-7C, a user may use embodiments of the system described herein to view a physical location and/or virtual objects augmenting the physical location as described herein. The image of FIG. 7A may be a view of a user from a helicopter or other elevated location to get a perspective view of an area. The system may include a camera for capturing an image or a series of images, such as in a video, of the physical environment. The camera may include location and orientation information similar to the augmented headset embodiments described herein. The system may use that information for locating, orienting, positioning, directing, or otherwise rendering virtual objects for presentation thereof. FIG. 7B therefore may represent a view of a user in real time of the virtual objects augmenting the physical view of the user, such as through an augmented reality system. The FIG. 7B view may also represent the display of the physical environment with augmentation by virtual objects through other user interface displays. The system may be configured to work in either configuration or simultaneously such that a user may view the physical environment augmented by virtual objects in real time or delayed through a virtual reality system, augmented reality system, and/or screen display system.

In an exemplary embodiment, the location and/or orientation of the physical environment such as viewed through the augmented reality system may be offset from the environment captured through the camera or other recording method. For example, the user may have an augmented reality headset according to embodiments described herein in which the user is within a cabin of a helicopter, while the camera for capturing images and/or video is positioned on an exterior surface of the helicopter body. The replay between the captured images and the rendered virtual objects may therefore be inaccurate during reproduction for presentation on a display other than the augmented reality headset. The system may therefore include a video/image editing suite to calibrate the captured images/video with the rendered virtual objects.

Exemplary embodiments may include a specialized video editing suite that adds an AR type overlay to airborne video or images. For example, airborne video gathered during electrical infrastructure inspection events may be used as a baseline environment for which virtual objects are rendered thereover. The baseline video may be associated with a synchronous metadata file that enables the precision geo-registration of external digital information sources. In addition to allowing the insertion of graphical information via a KML/KMZ file (or other data source as described herein), exemplary embodiments allow the precise alignment of the digital information by providing adjustment relative to the underlying coordinate system. This capability enables the user to eliminate or reduce the earth/imagery alignment errors typically seen in geo-registered airborne video footage. By integrating three sources of information (for example, but not limited to, clean video, sensor metadata and a KML/KMZ file), exemplary embodiments described herein may be used to create usable still or video imagery featuring a synthetic, georeferenced overlay (the KML/KMZ information). KMZ file is a zipped or condensed KML file.

Exemplary embodiments include a simple user interface that may allow the operator to precisely position georeferenced overlays onto underlying imagery. Exemplary embodiments include a tool kit that can permit required adjustments to create accurate alignment of a virtual overlay to an imagery file. Exemplary embodiments may include compensation functions for different alignment errors seen in georeferenced imagery, such as, without limitation: simple commands to load the media file, metadata set and/or KML information; traditional play/pause/scrub buttons to control the video; easy-to-use sliders to control the virtual object's Altitude, Heading, Pitch, and Roll relative to the underlying imagery; sensor field of view slider to control the relative size of the overlay, such as relative zooming; slider interface that allows precise altitude corrections relative to the base Digital Elevation Map; frame offset command allows user adjustment of the metadata file timing if necessary; and any combination thereof. Exemplary embodiments may be fully customizable and can be tuned to meet specific application needs.

Figure 8:
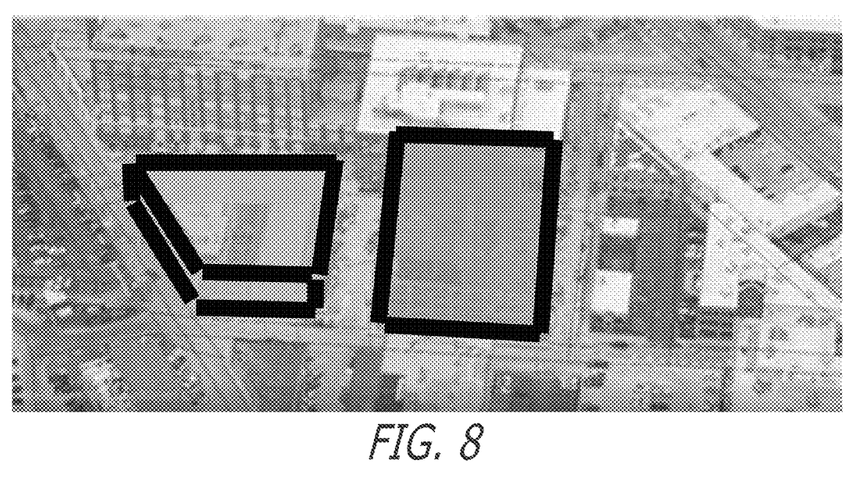
FIG. 8 illustrates exemplary embodiments used to show future building locations and project phases.

FIG. 8 illustrates exemplary embodiments used to show future building locations and project phases.

Referring back to FIG. 2 as an exemplary specific use case, exemplary embodiments may, be used to visualize, in real-time, local aircraft based on a geo-position-based display of Automatic Dependent Surveillance-Broadcast (ADS-B) information. An air traffic display software (such as, for example, Augmntr's HoloAirTraffic) displays each ADS-B enabled aircraft in the vicinity (set as a 50 km radius around the user) as a digital icon, and shows the target's tail number, altitude, and range (relative to the user). Exemplary embodiments permit a user to configure a proximity radius, distance, or location of interest and display virtual objects in relation to select physical objects in the configured proximity. In an exemplary embodiment, the proximity may change based on a selected view to reduce visual clusters in a 1:1 scale by using a smaller proximity distance verses the overview or larger scale view with a larger proximity distance. The specific aircraft can be 'selected' to access additional levels of information, including a photograph of the actual airplane (if available) and the ownership information. Exemplary embodiments use the aircraft's tail number (from the ADS-B data packet) to query open-source web-based data servers for additional information on the aircraft in question. Embodiments of this technique can be applied to any type of vehicle, vessel or other GNSS-tracked asset assuming the data set is available to draw from.

Exemplary embodiments used ADS-B for aircrafts, as this is a low-latency system that is freely accessible. This same technique can be applied to viewing ships, or other vessel, with their AIS transponder system. Likewise, this could be adapted for example for law enforcement, fire services, Customs & Border Patrol, airports/airfields, large utility installations, shipping ports, or similar entities with fleets of vehicles. As long as the individual vehicle is reporting its location via some method, exemplary embodiments described herein may be used to display this information in an augmented reality fashion, both as an overview view and in a 1:1 implementation. Exemplary embodiments, therefore, are configured to access a suitably-defined data stream where either the vehicle (or other object) self-reports it's ID number, location and time stamp, or this same data is provided by an external monitoring method.

Exemplary applications that may benefit from exemplary embodiments described herein, include, without limitation: an AR device-based solution that renders real-time georegistered information; AR and/or VR control of external sensor nodes via voice interface or other command methods such as hand gestures, etc.; rendering large, complex data sets into both a georegistered, 1:1 scale and overview-scale displays to provide novel imaging solutions; ability to switch from overview-scale display to a specific location in the 1:1 scale mode by looking at the desired point of placement and issuing the command to switch view modes; ability for the 1:1 viewing mode to simulate the presence of a physical location by displaying appropriate digital information representing items that are present at that actual location (icons representing roads, buildings, landmarks, etc.).

Exemplary embodiments of the simulated 1:1 mode can be utilized at any location to allow the user to get the impression of what would be seen at the actual corresponding real-world location. Exemplary embodiments may also permit users to create incorporate text comments, text data, planned path routings, insert shape files, or other intended reference items in the overview view mode that are then displayed at the selected location to the user when in 1:1 view mode, either in the simulated position or at the physical location on the earth.

Exemplary embodiments are designed to be hardware-agnostic and are not tied to a specific AR or VR product, brand or service, thereby allowing the customer to use appropriate AR/VR technology evolutions as they materialize.

Exemplary embodiments of the system described herein can be based in software and/or hardware. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

Exemplary embodiments of the systems described herein may be used in various application such as, without limitation a 3D Enriched Urban Terrain that may develop and deploy a suite of tools and workflows to rapidly and cost-effectively collect and process accurate, measurable, updatable interactive displays of maps/models of geometry, materials and functions of vertical and horizontal infrastructure.

Exemplary embodiments of the systems described herein may be used in various application such as, without limitation an Integrated Visual Ensemble that may include a Head Mounted Display System that provides enhanced Situational Understanding capability to the Warfighter by integrating targeting imagery, geolocation information, situational awareness and mission command information without increasing Soldier cognitive burden.

Exemplary embodiments of the systems described herein may be used in various application such as, without limitation a Mission Planning Technologies for Small Units that may include tools that enable synergistic and optimized mission planning at the company and below level during one or more phases of the operation.

Provided herein is a simple case study to examine the challenges of current augmented/virtual reality systems and overlaying datasets in such environments. Difficulty in overlaying datasets in an augmented reality system may be due to the terrain and chain in elevation over an area. The exemplary use case includes an available high-resolution raster elevation data (derived from an also-available LIDAR point cloud), and interesting vector data. The goal of this example case study is to incorporate both the raster elevation data and vector data into a Microsoft HoloLens as a representative mobile augmented reality headset device. This initial case study example does not incorporate the raw LIDAR point cloud into the HoloLens, although this could be accomplished as an alternative embodiment.

All data used for this case study came from open sources. The raster elevation data's source is the United States Geological Survey (USGS) and features 1/9 arc second (~3 m nominal post spacing, sub-cm elevation resolution) data for an area 683 m×875 m (0.42 mi×0.54 mi), totaling ~255 KB of raw elevation data. The vector data is from Open- StreetMap and covers the same physical area. This vector data contains roads, power poles and lines, and several other points of interest. All items from OpenStreetMap contain only latitude and longitude information, with no altitude data available. This presents a representative example of a technical challenge described herein in which data sets are incomplete to fully render an overlay in a three dimensional environment.

Exemplary embodiments include software configured to ingests several data formats. Utilizing this software asset, exemplary embodiments are also configured to convert the source raster elevation data from IMG format to ESRI Gridfloat, and the OpenStreetMap vector data to KML. WGS84/EGM96 was selected as the common datum and converted all data sets as necessary, although other common system may be used. This conversion permits uniformity and coordinate transferability across the respective data sets. All individual coordinates remained unaltered with no manual position adjustments applied. This process maintained the relative positioning of all points within the data sets. The only adjustments applied to the vector data was manual styling of relevant icons, the choice of vibrant colors, and selection of reasonable line widths for objects, such as, for example, streets and highways. Exemplary embodiments of the software renders these data sets as a common 3-D representation containing both raster elevation data and the vector data set. The software features display options allowing the data view as either wireframe format, or with a texture applied.

Given the real-world scale of these types of data sets, exemplary embodiments may include having a "overview mode". Exemplary embodiments of the software may provide a configurable viewing scale that includes both a 1:1 display and an overview mode that permits an easy overview of large areas. Exemplary embodiments of the overview display mode may be useful and beneficial for tasks such as mission planning, area overwatch, asset placement monitoring, etc.

Processor demand and complex graphics display activities consume both battery power and can degrade the video and processor bandwidth necessary for 60 fps viewing. Therefore, advanced techniques to reduce rendering complexity as described herein, while retaining data set integrity and detail, may be incorporated to deploy rich augmented reality 3-D experiences to wearable AR devices. For example, Level of Detail (Lod) techniques, DEM simplification, and/or other methods may be used to provide a desired frames per second viewing while compensating for battery power and bandwidth.

Figure 9:
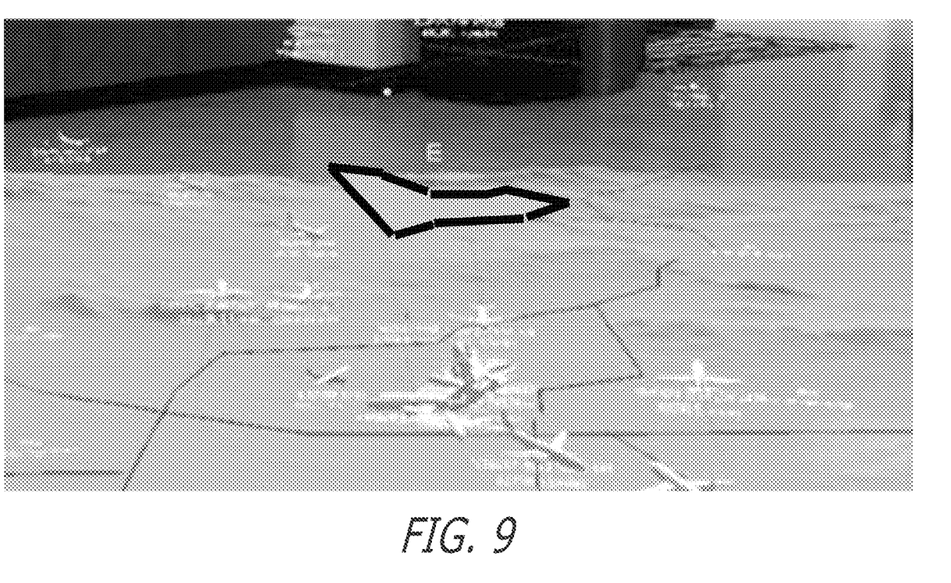
FIG. 9 illustrates an exemplary overview display configuration according to embodiments described herein.

Exemplary embodiments may include putting together all the capabilities described herein or any combination thereof. This example combines both static data sets (a DEM and a vector data set) along with real-time movers reporting positions via transponder feeds. This demonstration integrates these real-time moving geo-registered objects (ADS-B enabled aircraft) into the baseline DEM (a 2-D decimated raster elevation data set as described herein, such as represented in FIG. 2) and renders an AR display on the HoloLens. All aircraft positions are appropriately registered relative to the underlying elevation data set and to each other. FIG. 9 illustrates a 50 km area around Las Vegas, Nev. due to the interesting map elevation features and a high density of various aircraft types at various altitudes. FIG. 9 illustrates an exemplary overview display configuration according to embodiments described herein. FIG. 9 illustrates an exemplary HoloLens showing the "AR Blue Force Tracker" demonstration. This shows real-time moving aircraft geo-registered to underlying DEM and vector data display around the Las Vegas area.

As an example of applications of embodiments described herein, a mission commander may use exemplary systems and methods described herein for monitoring troop movements and asset positions, in a real-time 3-D AR display. The underlying map or battlefield surface could feature numerous disparate data sources, all converted, aligned and displayed in a method according to embodiments described herein. Utilizing exemplary work flows described herein enable the creation of such an augmented reality display.

Referring back to the "overview" viewing mode, exemplary embodiments may be of significant benefit for tasks such as asset placement, area overwatch, and infrastructure identification tasks, etc. Exemplary embodiments may be used for infrastructure identification and may render geo-registered AR display technologies. Exemplary embodiments may display virtual objects that may be obscured by physical features, such as the landscape, buildings, or other object. For example, a system may display a line of utility poles in which the augmented reality display still shows the poles, their identity and location, even though physical poles may be obstructed by hills or other features.

Imagine an addition to this scenario where a power service crew vehicle, equipped with a location transponder, was in the scene. In this situation, the AR display would show the work vehicle position in addition to the pole locations in both the 1:1 and overview viewing modes. This gives a new method of managing the infrastructure and the maintenance assets. For example, referring to FIGS. 4A-4B, if a work vehicle were behind a hill and not physically visible to a user of the augmented reality system, the vehicle may be identified and displayed as a virtual object, such as in text, symbol, or other representation, to the user at their location to indicate its presence and location. Exemplary embodiments of software described herein can show any sort of infrastructure (communication lines, plumbing, power lines, airport runway lights, etc.) if there is geo-registered data connecting the asset's physical location to geographic coordinates.

Various industrial, utility installation, law enforcement and security service applications may incorporate exemplary embodiments herein where large areas with distributed assets are actively monitored and/or managed. The underlying map/display surface could feature many disparate data sources, all converted, aligned and displayed much like this demonstration. The AR headset delivers real-time unit status and location information via the holographic display. With both 1:1 viewing and the overview mode, the user can control the desired viewing mode to gain better overall Situational Understanding of all assets and personnel.

As another use-case example, exemplary embodiments may be used for other situational understanding activities at a neighborhood destroyed by the Tubbs Fire, which started on Oct. 9, 2017 in Sonoma County, Calif. This fire destroyed a reported 5,643 structures and burned over 36,000 acres. In this Real-World test, the augmented reality system displayed geo-registered property parcel data and revealed the location, address and property parcel information of homes destroyed by the fire in Coffey Park. By viewing holographic icons representing the former structures, the user is able to establish personal orientation relative to buildings and landmarks no longer present. One can conceive that a geo-capable augmented reality system could be of substantial benefit during rescue and recovery events following large-scale disasters, or in other situations where traditional reference landmarks are unavailable. AR representation of landmarks no longer in existence delivers Situational Understanding. FIGS. 1A-1C illustrate this exemplary use case in which virtual objects in the form of cubes denote former home locations.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A method, comprising:
   receiving a data set, wherein the data set is missing information in order to render a virtual object in three dimensions;
   storing a reference data set in memory, wherein the reference data set is stored in a mesh at different mesh densities and comprises information about the missing information;
   supplying the missing information from the data set with data from the reference data set;
   providing an augmented reality system within a real world environment;
   defining a common reference frame based on a local reference frame related to the real world environment in relation to the augmented reality system residing in the real world environment;
   converting the data set to the common reference frame; and
   generating the virtual object based on the data set in the common reference frame on an augmented reality system such that the virtual object is rendered in relation to the real world environment directly viewable through the augmented reality system in which the virtual object is overlaid.

2. The method of claim 1, wherein the reference data set defines a local reference frame for an augmented reality system related to a real world environment within which the virtual object is generated; and the common reference frame is relative to the local reference frame, and the data within the reference data set in the mesh at different mesh densities corresponds to different locations within the local reference frame so that all of the reference data within the reference data set corresponds to a unique location within the local reference frame.

3. The method of claim 1, wherein the data set is geo-registered and the reference data is geo-registered.

4. The method of claim 3, wherein the different mesh densities of the reference data set corresponds to data deviations where the different mesh densities is of a higher mesh densities when the data has a greater variability and less mesh densities when the data has a lower variability.

5. The method of claim 4, further comprising receiving a raw reference data set, tessellating the raw reference data set to transform the raw reference data set into a first mesh data set in which the first mesh data set is in a triangular data representation, and the first mesh data set is used to create the reference data set.

6. The method of claim 5, wherein the first mesh data set is simplified to reduce the first mesh data set to create the reference data set.

7. The method of claim 6, wherein the first mesh data set is simplified by combining triangles of the first mesh data set when a comparison between nearest neighbor adjacent triangles is within a threshold.

8. The method of claim 6, wherein the data is combined by taking an average of the data of nearest neighbor adjacent triangles that is within the threshold.

9. The method of claim 6, wherein the first mesh data set is simplified by reducing a level of detail for data that is within the first mesh data set that is positionally further away from a first position generating a point of view of the rendered virtual object in the common reference frame.

10. The method of claim 6, wherein the reference data set relates to a physical environment, including elevation of a ground level of the physical environment, wherein the data set comprises missing information and the reference data set comprises information related to the missing information of the data set.

11. The method of claim 10, further comprising receiving a location and orientation of an augmented reality system for displaying the virtual object, and displaying the virtual object based on the data set that is geo-registered.

12. A system for displaying real-time, geo-registered data in an augmented reality environment, comprising an augmented reality display system, one or more processors, memory, and non-transitory machine readable instructions that when executed by the one or more processors are configured to:
   store a reference data set in memory, wherein the reference data set is stored in a mesh at different mesh densities and the reference data is geo-registered so that all of the data within the reference data set corresponds to a unique location;
   receive in real time geo-registered information, wherein the real time geo-registered information is missing data in order to render a virtual object in three dimensions;
   define a common reference frame based on a local reference frame related to the real world environment in relation to the augmented reality system residing in the real world environment;
   transform the geo-registered information into a data set to be displayed by the augmented reality system based on the common reference frame;
   supply the missing data from the real time geo-registered information with supplemental data from the reference data set; and
   display a virtual object on the augmented reality display system based on the data set as transformed based on the common reference frame and the supplied missing data from the reference data set such that the virtual object is rendered in geo-registered relation to a real world environment directly viewable through the augmented reality system in which the virtual object is overlaid.

13. The system of claim 12, wherein the non-transitory machine readable instructions that when executed by the one or more processors are further configured to simplify the real time geo-registered information.

* * * * *